UNITED STATES PATENT OFFICE 2,045,167

RUBBER VULCANIZATION

Robert L. Sibley, Nitro, W. Va., assignor, by mesne assignments, to Monsanto Chemical Company, Wilmington, Del., a corporation of Delaware No Drawing. Application March 18, 1931, Serial No. 523,647

2 Claims. (Cl. 18—53)

This invention relates to the vulcanization of rubber by an improved process, wherein there is employed a member of a preferred class of compounds which improve the action of the accelerator used in the vulcanization process and provide for the more ready handling of the rubber stocks. More specifically, the preferred class of compounds act to retard the vulcanization process in the earlier stages of the process, but do not exert such retarding action and may even accelerate the vulcanization in the later stages of the process. This retarding effect is highly desirable, as scorching or vulcanizing on the mixing rolls is thereby substantially prevented. A substance which possesses the retarding properties described is known as a retarder. The preferred class of compounds employed in the manner hereinafter described comprises salicylic acid and substitution-derivatives thereof possessing the structure

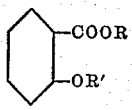

where R represents hydrogen, a metal or a salt or ester-forming radical, and R' represents hydrogen or an acid radical.

The retarding effects of a chemical compound in the process of vulcanizing rubber can be readily ascertained by incorporating a small portion of the compound or retarder in a rubber stock of vulcanization characteristics, preferably in the presence of an accelerator, heating portions of the rubber compound thus formed for various periods of time and under various pressures, and comparing the modulus of elasticity and tensile strength of the vulcanized product so formed with the modulus and tensile figures of another vulcanized rubber product prepared in the manner specified above but containing no retarder. Further data can be obtained by determining the plasticity of rubber stocks heated for varying periods of time at temperatures below those used in the rubber curing process.

As examples showing the use of the preferred class of compounds, the following four rubber stocks, designated "A", "B", "C", and "D", were prepared and vulcanized by heating under various pressures and for various periods of time. The cured stock was then tested to determine its tensile strength and modulus under various degrees of elongation.

|  | Stock A | Stock B | Stock C | Stock D |
|---|---|---|---|---|
|  | Parts | Parts | Parts | Parts |
| Pale crepe rubber | 100 | 100 | 100 | 100 |
| Zinc oxide | 5 | 5 | 5 | 5 |
| Sulfur | 3 | 3 | 3 | 3 |
| Crotonaldehyde derivative of the reaction product of mercaptobenzothiazole and hexamethylene-tetramine | 0.6 | 0.6 | 0.6 | 0.6 |
| Salicylic acid |  | 0.2 |  |  |
| Acetyl-salicylic acid |  |  | 0.2 |  |
| Methyl salicylate |  |  |  | 0.2 |

The results of the tests of the rubber composition thus described are set forth in Table I.

Table I

| Cure minutes | Steam pressure lbs./in.² | Stock | Modulus of elasticity in lbs./in.² at elongations of | | | Tensile lbs./in.² at break | Ultimate elongation percent |
|---|---|---|---|---|---|---|---|
| | | | 300% | 500% | 700% | | |
| 15 | 10 | A | 88 | 154 | 420 | 1763 | 980 |
| 15 | 10 | B | Stock pitted | | | | |
| 15 | 10 | C | Stock pitted | | | | |
| 15 | 10 | D | 77 | 127 | 336 | 1680 | 1010 |
| 20 | 10 | A | 100 | 218 | 695 | 2180 | 930 |
| 20 | 10 | B | 77 | 129 | 324 | 2000 | 1010 |
| 20 | 10 | C | 77 | 127 | 285 | 1410 | 1030 |
| 20 | 10 | D | 107 | 204 | 600 | 2108 | 950 |
| 30 | 10 | A | 136 | 273 | 1025 | 2710 | 890 |
| 30 | 10 | B | 113 | 222 | 689 | 2115 | 920 |
| 30 | 10 | C | 97 | 185 | 614 | 2100 | 935 |
| 30 | 10 | D | 130 | 273 | 995 | 2690 | 900 |
| 90 | 20 | A | 217 | 680 | 2580 | 3740 | 770 |
| 90 | 20 | B | 163 | 588 | 2385 | 3580 | 770 |
| 90 | 20 | C | 161 | 488 | 2070 | 3450 | 795 |
| 90 | 20 | D | 235 | 615 | 2283 | 3810 | 810 |
| 120 | 20 | A | 256 | 687 | 2410 | 4100 | 810 |
| 120 | 20 | B | 245 | 632 | 2405 | 4175 | 825 |
| 120 | 20 | C | 230 | 595 | 2160 | 4175 | 830 |
| 120 | 20 | D | 224 | 562 | 2430 | 3930 | 800 |

The above table shows by comparison the effect of the presence of a compound of the preferred class, as for example salicylic acid, acetyl-salicylic acid and methyl salicylate, on the rate of cure of a rubber stock of vulcanization characteristics. It can be readily seen that the presence of one of the preferred class of compounds exerts a marked retarding effect on the cure in the shorter timed and lower pressure cures but does not retard at full cure.

As further examples of the use of the preferred class of materials, the following stocks, designated "E", "F" and "G", were prepared and tested as in the manner above described.

|  | Stock E | Stock F | Stock G |
|---|---|---|---|
|  | Parts | Parts | Parts |
| Pale crepe rubber | 100 | 100 | 100 |
| Zinc oxide | 5 | 5 | 5 |
| Sulfur | 3 | 3 | 3 |
| The acetaldehyde derivative of the reaction product of para-para-diamino-diphenyl-methane and mercaptobenzothiazole, prepared according to the method set forth in the co-pending U. S. patent application Serial No. 456,808 which matured into U. S. Patent 1,914,047. | 0.3 | 0.3 | 0.3 |
| Diphenylguanidine | 0.7 | 0.7 | 0.7 |
| Sodium salicylate |  | 0.1 |  |
| Phenyl salicylate |  |  | 0.1 |

The results of the physical tests upon the vulcanized products from the above rubber stocks are set forth in Table II.

Table II

| Cure minutes | Steam pressure lbs./in.² | Stock | Modulus of elasticity in lbs./in.² at elongations of | | | Tensile at break in lbs./in.² | Ultimate elongation percent |
|---|---|---|---|---|---|---|---|
|  |  |  | 300% | 500% | 700% |  |  |
| 15 | 10 | E | 89 | 201 | 597 | 2160 | 960 |
| 15 | 10 | F | 95 | 171 | 452 | 1870 | 995 |
| 15 | 10 | G | 102 | 196 | 569 | 2275 | 995 |
| 20 | 10 | E | 121 | 252 | 820 | 2270 | 890 |
| 20 | 10 | F | 103 | 185 | 580 | 2560 | 990 |
| 20 | 10 | G | 105 | 203 | 720 | 2295 | 930 |
| 30 | 10 | E | 95 | 283 | 1170 | 2640 | 840 |
| 30 | 10 | F | 142 | 297 | 1020 | 2990 | 915 |
| 30 | 10 | G | 140 | 324 | 1155 | 2810 | 865 |
| 60 | 20 | E | 270 | 832 | 3260 | 4695 | 780 |
| 60 | 20 | F | 297 | 905 | 3390 | 4550 | 760 |
| 60 | 20 | G | 285 | 818 | 3300 | 4375 | 750 |
| 90 | 20 | E | 280 | 940 | 3870 | 4725 | 745 |
| 90 | 20 | F | 301 | 1000 | 3890 | 4665 | 735 |
| 90 | 20 | G | 288 | 978 | 3750 | 4490 | 735 |

The results given in Table II show on referring to the 700% modulus that further compounds of the preferred class, for example sodium salicylate and phenyl salicylate, exhibit desirable retarding action on the curing process in the shorter timed and lower pressure cures, when present in a rubber stock of vulcanization characteristics.

Other substitution-derivatives of salicylic acid, for example potassium salicylate, ammonium salicylate, beta-naphthyl salicylate, benzoyl-salicylic acid and the like, may be employed as further examples of the preferred class of compounds in retarding the vulcanization of a rubber stock in the manner hereinbefore set forth.

This invention is not restricted to the use of the particular compounds given in the disclosure as examples, nor is it restricted to the use of the preferred class of compounds in the particular rubber mixes herein described, since other rubber mixes employing a wide variety of compounding ingredients are readily apparent to a rubber compounder. The invention is limited only by the claims attached hereto as part of the present application.

What is claimed is:

1. The process of retarding the vulcanization of a rubber stock comprising rubber, sulfur and a vulcanization accelerator selected from a group consisting of the crotonaldehyde derivative of the reaction product of mercaptobenzothiazole and hexamethylene-tetramine and the acetaldehyde derivative of the reaction product of para-para-diamino-diphenyl-methane and mercaptobenzothiazole which comprises adding to said stock a compound possessing the structure of

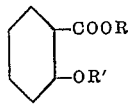

where R represents hydrogen, a metal, or a salt- or an aromatic ester-forming radical and R' represents hydrogen or an acyl radical and heating to complete the vulcanization.

2. The process of retarding the vulcanization of a rubber stock comprising rubber, sulfur and a vulcanization accelerator selected from a group consisting of the crotonaldehyde derivative of the reaction product of mercaptobenzothiazole and hexamethylene-tetramine and the acetaldehyde derivative of the reaction product of para-para-diamino-diphenyl-methane and mercaptobenzothiazole which comprises adding to said stock salicylic acid and heating to complete the vulcanization.

ROBERT L. SIBLEY.